US012801757B2

(12) United States Patent
Gold Haroush

(10) Patent No.: US 12,801,757 B2
(45) Date of Patent: Nov. 17, 2026

(54) METHODS SYSTEMS AND FUNCTIONALLY ASSOCIATED MACHINE EXECUTABLE CODE FOR MONITORING HETEROGENEOUS COMPUTING NETWORKS

(71) Applicant: Wix.com Ltd., Tel Aviv (IL)

(72) Inventor: Roy Gold Haroush, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 64 days.

(21) Appl. No.: 18/920,235

(22) Filed: Oct. 18, 2024

(65) Prior Publication Data

US 2025/0278491 A1 Sep. 4, 2025

Related U.S. Application Data

(60) Provisional application No. 63/591,136, filed on Oct. 18, 2023.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
USPC ........................................................... 726/25
See application file for complete search history.

(56) References Cited

U.S. PATENT DOCUMENTS 9,210,185 B1 * 12/2015 Pinney Wood ..... H04L 63/1433
12,445,474 B1 * 10/2025 Reed ..................... H04L 67/535
12,500,920 B2 * 12/2025 Crabtree ............... H04L 63/102
12,526,303 B2 * 1/2026 Dunn .................. H04L 63/1433
12,536,542 B2 * 1/2026 Kayathwal ......... G06Q 20/4016
2018/0027009 A1 * 1/2018 Santos ................ H04L 63/1441 726/25
2019/0230115 A1 * 7/2019 Barton .................... H04L 45/42
2020/0177618 A1 * 6/2020 Hassanzadeh ........ G06F 21/552
(Continued)

FOREIGN PATENT DOCUMENTS

WO WO-2023283357 A1 * 1/2023 .......... G06F 11/3604

OTHER PUBLICATIONS

R. Subramanyan; A scalable SNMP-based distributed monitoring system for heterogeneous network computing; IEEE:2020; pp. 1-9.*

*Primary Examiner* — Monjur Rahim
(74) *Attorney, Agent, or Firm* — Heidi Brun Associates, Ltd.; Heidi M. Brun

(57) ABSTRACT

Disclosed is methods, devices, systems, and functionally associated machine executable code for monitoring a heterogeneous computing network which includes multiple computing domains hosted on physical and virtual computing clusters which may interconnect through a plurality of data network segments. Systems according to methods of the disclosed invention may include a heterogeneous set of Network Monitoring Elements (NME), wherein at least some of the monitoring elements are deployed to different respective nodes and or segments on the heterogeneous computer network and are configured to detect network related parameters and events associated with their respective node. An attack path tracer or generator may scan the heterogeneous network to discover possible attacks paths through which the cybersecurity posture on the network may be attacked, compromised and or breached.

13 Claims, 13 Drawing Sheets

(56) References Cited

U.S. PATENT DOCUMENTS

| | | | | |
|---|---|---|---|---|
| 2021/0360401 | A1* | 11/2021 | Marinho | H04L 45/02 |
| 2022/0060507 | A1* | 2/2022 | Crabtree | G06F 16/2477 |
| 2022/0060509 | A1* | 2/2022 | Crabtree | H04L 63/08 |
| 2022/0330027 | A1* | 10/2022 | Djukic | H04L 47/2475 |
| 2024/0314158 | A1* | 9/2024 | Bourzikas | H04L 63/1441 |
| 2024/0340301 | A1* | 10/2024 | Thompson | H04L 63/20 |

* cited by examiner

METHODS SYSTEMS AND FUNCTIONALLY ASSOCIATED MACHINE EXECUTABLE CODE FOR MONITORING HETEROGENEOUS COMPUTING NETWORKS

RELATED APPLICATIONS

The present patent application claims priority from U.S. Provisional Patent Application No. 63/591,136, entitled "Methods Systems & Functionally Associated Machine Executable Code for Monitoring Heterogeneous Data Networks" and filed on 18$^{th}$ of October 2023. The entire content of the '136 provisional patent application is hereby incorporated by reference into the present application in its entirety.

FIELD OF THE INVENTION

The present invention relates generally to the field of computer networking monitoring and cyber-protection. More specifically, the present invention relates to methods, circuits, systems and functionally associated machine executable instructions for monitoring and analysis of hybrid multidomain enterprise computing networks and the cybersecurity posture of the enterprise's computing infrastructure.

BACKGROUND

Within large, complex organizations composed of various operational units like sub-companies, subsidiaries, divisions, and R&D units, each unit plays a crucial role in the overall enterprise by contributing specific functional components. This segmented organizational paradigm allows individuals to work within smaller, more focused teams, fostering a sense of intimacy and belonging while still aligning with broader organizational objectives. These types of organizational structures can be particularly beneficial in the realm of research and development, where such a setup can encourage high developer velocity, reduce bureaucratic hindrance, and amplify the impact of everyone's contributions. However, organizations or enterprises with complex structures also require complex and sophisticated computer infrastructure with a variety of different and interconnected segments, each specifically configured for the computing needs of one or more operational units or domains, while at the same time selectively exposing data and interfaces to other operational units, such as for example the network management unit.

Historically and even today, many organizations built their computing infostructure hosted and controlled by the organization or third party under the control of the organization. Over the past decade, the introduction of "cloud computing", a transformative technology model that delivers a wide range of computing services over the Internet, has expanded the possible functionality and scalability of organizational computing platforms. While at the same, cloud computing has increased the possible structural and management complexity of the computing platforms which respective organizations now need to maintain and protect from cyberattack and breach.

Cloud computing provides organizational computing platforms with on demand services encompassing servers, storage, databases, networking, software, and more. An attractive feature of cloud computing is its ability to provide flexible, scalable, and efficient computing resources on-demand. Users can access and manage these resources via the Internet, paying only for what they use. These features of cloud computing eliminate the need for substantial upfront hardware investments and reduce the costs associated with maintaining and upgrading physical infrastructure. Additionally, cloud computing facilitates rapid scalability, allowing businesses to adjust resources quickly in response to changing needs of various units. A drawback of such on-demand resources provided through the internet is a loss of control and visibility over the processing having direct access to an organization's data, very often including very sensitive and confidential information.

Software as a Service (SaaS), as a subset of cloud computing delivers software applications over the Internet, also from software applications hosted by third-party providers on their hardware or on hardware provided them according to a cloud model. Although SaaS eliminates the need for users to install, manage, or upgrade software on individual devices and comes with numerous other benefits, it comes with the same drawbacks and concerns as general cloud computing services.

Despite the above-mentioned drawbacks, cloud and SaaS technologies continue to evolve and expand in adoption. They are likely to remain a large part of the computing infrastructure and digital transformation strategies of organizations worldwide for the foreseeable future. FIG. 1 illustrates an exemplary enterprise/organizational network to be protected by embodiments of the present invention.

As organizations, enterprises and other types of entities grow and evolve, they require new technological and computing services essential for sustaining their specific pace of development and operational efficiency. Central to these evolving organizations' day-to-day functions are often hybrid computing platforms comprised of extensive integration of on-premises physical computing infrastructure interconnected with Cloud and Software as a Service (SaaS) solutions through one or more internet gateways. Often, these hybrid computing platforms integrate with more than one Cloud service and more than one SaaS solution.

The proliferation of numerous cloud and SaaS accounts leads to a growing struggle for computing network security teams responsible for the security and integrity of respective hybrid computing platforms. Since the primary task of these security teams is to identify, alert, and respond to emerging security threats attacking and breaching nodes and segments of the network promptly, growing numbers of nodes and segments with limited visibility only increase the difficulty of this task. Moreover, protection of the network becomes increasingly demanding, and the likelihood of breach increases due to the sheer volume and variety of potential vulnerabilities that arise in such dynamic cloud environments.

Turning now to FIG. 1, there is shown a functional block diagram with annotations illustrating processes and resources of an exemplary legacy enterprise computing platform consisting of a variety of computing resource types, including both physical and virtual (i.e. Cloud and SaaS) computing resources interconnected as segments and or domains of the same hybrid network. As clear from FIG. 1, the complexity of maintaining cybersecurity in these settings is further exacerbated by the diverse array of unrelated and uncoordinated security tools employed. Teams often use a combination of Cloud Security Posture Management (CSPM), Cloud-Native Application Protection Platform (CNAPP), Cloud Workload Protection Platform (CWPP), Cloud Infrastructure Entitlement Management (CIEM), and Security Information and Event Management (SIEM) systems. Each of these tools generates distinct types of alerts, operates at different severity levels, and follows unique procedural playbooks. This not only makes it challenging to prioritize response and mitigation efforts but also complicates the process of obtaining a unified, comprehensive view of an organizations' hybrid computing platform's overall security posture.

Monitoring and protecting the vast and varied enterprise computing platforms of today involves dealing with multiple domains, encompassing both physical and virtual resources. Doing so efficiently requires a nuanced understanding of the unique security requirements of each network element and the need for effective coordination to ensure data and communication flows are secure across the organization. An integrated cybersecurity strategy in the form of automatic policy must be put in place and strictly executed and enforced. The policy must include proactive threat detection, effective incident response, and continuous monitoring of all components within an organization or enterprises' computing and communication infrastructures, physical and virtual. The required policy must include a flexible and adaptable security approach to account for the rapidly changing nature of cloud-based solutions and the constant evolution of cybersecurity threats which arise from these rapid changes. The policy must embody a strategy equipped to address new challenges as they emerge, ensuring the protection of sensitive data and the integrity of the organization's technological ecosystem.

The challenges associated with monitoring and protecting complex hybrid expansive organizational computing platforms are multifaceted. These challenges include managing a diverse array of cloud-based environments and legacy physical networks, navigating a complex landscape of security tools and protocols, and continuously adapting to new and emerging cybersecurity threats. There is therefore a need in the field of computing network cybersecurity for a comprehensive and effective cybersecurity platform capable of producing systems with strong cybersecurity postures in dynamic settings. There is a need for innovations and solutions in the field of cybersecurity, including improved monitoring and attack intervention technologies. There is also a need for automated monitoring and protection strategy deployment and adaptation. There is a need for innovations which result integrated cybersecurity systems which encompasses and protects every aspect of their respective organization's diverse and evolving IT infrastructure.

Acronyms

Definitions of acronyms used across this disclosure, including the following diagrams and overall specification:

AWS—Amazon Web Services
CGP—Google Cloud Platform
CIEM—Cloud infrastructure entitlement management
CM—Configuration Management
CNAPP—Cloud-Native Application Protection Platform
CSPM—Cloud Security Posture Management
CVE—Common Vulnerabilities and Exposures
CWPP—Cloud Workload Protection Platform
CY*—Cyber security modules
IAM—Identity and Access Management
MTTA—Mean Time to Acknowledge
MTTR—Mean Time to Repair
RCA—Root Cause Analysis
SIEM—Security Information and Event Management
SSRF—Server-Side Request Forgery
VM—Vulnerability Management JIRA is used as an example of bug tracking, issue tracking, and project management software. Slack is used as an example of a messaging app for business.

SUMMARY OF THE INVENTION

Embodiments of the present invention may include methods, systems, and functionally associated machine-executable code for monitoring heterogeneous computing networks. Such networks may consist of nodes of computing hardware, both physical and virtual/cloud, interconnected by data networking segments. Exemplary embodiments may produce comprehensive and dynamic systems for monitoring and managing cybersecurity in heterogeneous computing networks having multiple domains. Each domain may include computing resources providing specific services to distinct units within an organization or enterprise. These services could span multiple sectors, including R&D units, customer-facing applications, and core infrastructure services.

Embodiments may include a computing platform for deploying elements of a network monitoring system across various nodes of a hybrid computing network. Each deployed element may have one or more innovative features that contribute to specific capabilities and overall functionality of the cybersecurity system. Further embodiments may include deploying such systems across one or more hybrid computing networks, where this deployment is achieved using a platform consistent with embodiments of the present invention. This setup may ensure flexibility and scalability as organizational needs evolve or network configurations change.

Embodiments of the present invention may include one or more systems for monitoring a heterogeneous or hybrid computer network. Such a network may consist of multiple computing domains hosted on physical and virtual computing clusters that interconnect through data network segments. These systems may include a heterogeneous set of Network Monitoring Elements (NME), wherein at least some of the NMEs may be deployed to different respective nodes on the heterogeneous computer network and may be configured to detect network-related parameters and events associated with their respective nodes. For instance, NMEs may monitor both local traffic patterns and interactions between physical servers and cloud instances, allowing for a thorough analysis of network activity across a distributed infrastructure.

The system may further include an Attack Path Tracer (APT) configured to scan clusters and segments of the hybrid computer network to discover and map potential attack paths vulnerable to cyberattacks. The APT may work closely with NMEs to utilize real-time data about network conditions, known vulnerabilities, and unusual traffic flows. For example, APTs may map attack paths by identifying how a compromise in one part of the network (e.g., a vulnerable cloud resource) could lead to potential escalations in other parts (e.g., data storage systems). The APT may be activated preemptively to assess vulnerabilities and the overall security posture of the network, or it may respond to a specific suspected attack or breach, validating or dismissing the suspicion. Additionally, one or more APTs may be activated intermittently, according to a schedule, to maintain an updated assessment of the cybersecurity posture.

Systems according to embodiments of the present invention may include a Network Security Controller (NSC) that may be communicatively coupled with an APT and with one or more NMEs. The NSC may be configured to, upon receiving an indication of an event detection related to a specific category of events occurring within a mapped potential attack path, trigger an attack alert notification. For instance, when an APT identifies a high-risk attack path involving unauthorized access to critical nodes, the NSC may immediately generate an alert and prompt the security team to take remedial action.

NSCs, according to some embodiments, may communicate with at least some of the deployed NMEs and may receive indications relating to events of various event types detected by the NMEs. Events of specific types may include combinations of one or more events occurring concurrently with or without a combination of specific network parameters. For example, an NME may detect unusual login attempts combined with a spike in data transfers at a network node, prompting the NSC to generate a correlated alert regarding a possible data exfiltration attempt. The NSC may collect network activity information, including attack path information, from multiple sources, such as NMEs, APTs, and various logs, upon suspecting a cyberattack, providing a comprehensive overview of network behavior to detect coordinated attacks.

According to some embodiments, NMEs may generate and maintain logs of detected events and network parameters, such as node activity levels or deviations from normal operating baselines. An NSC may retrieve these logs either periodically or upon triggering a suspected attack alert notification. NMEs may store logs locally, while other NMEs may store logs in a centralized repository accessible by the NSC. This configuration may allow the NSC to retrieve logs from either local storage or a centralized repository, analyzing specific logs related to a suspected cyberattack to determine its characteristics, origins, and potential spread.

According to further embodiments, an exemplary system NSC may be functionally associated with a Discovery and Handshake Module (DHM), which may be configured to identify and establish communication with multiple NMEs of varying categories deployed across the computer network. The DHM may receive data related to activity detected by NMEs and provide an up-to-date map of all active monitoring elements. Furthermore, one or more APTs may use discovered NMEs to scan and map the hybrid computer network, ensuring that the entire network is continuously covered by monitoring processes. This may include dynamically adding new NMEs as new network nodes are brought online, maintaining seamless network visibility.

The DHM may perform various critical functions needed to adapt monitoring for evolving network configurations, topologies, and threats. For example, network scanning and mapping performed by APTs using DHM-discovered NMEs may prompt updates to an existing network map and the deployment of new NMEs to nodes identified as newly added or particularly vulnerable. Such deployment may be directed by an NSC, which integrates input from both the DHM and APTs to ensure optimal monitoring coverage across the network.

Embodiments may include a dashboard code generator configured to generate browser-renderable HTML and JavaScript dashboard code based on definitions within a system dashboard configuration file. The generated dashboard code may define both data visualization and system control interface elements. This dashboard may provide a holistic view of network security status, showing real-time metrics like detected vulnerabilities, attack path analyses, and alert timelines. The code may be structured in a Document Object Model (DOM) format, which may be utilized to ensure easy customization of the user interface, adapting to specific requirements of different organizational units.

A dashboard configuration editor may be provided to allow users to append or edit dashboard elements, such as types, configurations, and placements within the dashboard configuration file. For example, a security manager may use the editor to add a new panel showing the number of active attack paths or to adjust the layout to highlight the most critical alerts for easier analysis.

Embodiments of the system may include a data router for routing data from NMEs and the NSC to dashboard elements within an instance of rendered dashboard code. The data router may ensure that information is directed appropriately so that users viewing the dashboard can see current metrics and alerts, enhancing situational awareness and allowing security teams to make informed decisions rapidly.

NMEs, according to some embodiments, may include diverse attributes and may be configured for monitoring computing network parameters and events related to nodes across the computer network. The NMEs may be designed, selected, and configured prior to deployment to detect network-related parameters specifically relevant to the type of network node or segment they are being deployed to. For example, an NME deployed in a cloud environment may focus on monitoring API calls and authentication attempts, while an NME deployed on a physical server may monitor incoming and outgoing packet flows for anomalies.

NME detection capabilities may include identifying unusual network traffic patterns, signs of unauthorized access, or system vulnerabilities. NMEs may communicate detected events and parameters to system components, such as the NSC, which may then trigger appropriate responses. Additionally, NMEs may optionally log detected events and parameters, either in local storage or in a centralized repository. These logs may be accessed by other system components for further analysis, allowing the system to build a comprehensive historical record to aid in continuous assessment and to refine threat detection models.

The NSC and APT may be core components of some embodiments, where the NSC may be structurally designed to receive, process, and act on data provided by NMEs and APTs. The APT may scan network clusters and segments to map potential attack paths, leveraging data from NMEs and external threat feeds. The NSC may use this information to identify security threats and trigger appropriate responses, such as generating alert notifications or directing NMEs to increase the monitoring granularity on specific nodes. The NSC may also prioritize alerts based on severity, context, and potential impact. This exchange of information ensures a coordinated response to detected network threats, enhancing the system's ability to respond dynamically.

The DHM may be tasked with identifying and establishing communication with various monitoring elements deployed across the network. This may include dynamically discovering new or changed network elements and ensuring their seamless integration into the monitoring framework. The DHM may serve as a structural bridge between the physical network topology and the system's monitoring apparatus, facilitating continuous adaptation of the monitoring system in response to changes in the network environment, such as scaling up cloud services or deploying new on-premises resources.

The dashboard code generator may create user-interactive interfaces for data visualization and system control. Structurally, this component may generate browser-renderable HTML and JavaScript that reflects the real-time status of the network as monitored by NMEs and processed by the NSC. The dashboard may allow users to visualize network events and parameters, control monitoring elements, and respond to alerts. The flexibility of the dashboard's structure may support customization and adaptation to various user roles and preferences, such as different displays for technical analysts versus executive stakeholders.

The data router may be included as a structural element designed to manage the flow of information within the system, routing data from monitoring elements and the NSC to the dashboard and other components as necessary. This routing may ensure that the latest network security information is continuously updated and available where it is needed most. Functionally, the data router may also include capabilities for advanced data processing and analytics, which could enhance the system's ability to interpret and respond to network events effectively.

According to embodiments of the present invention, each feature and element described herein may contribute to an aspect of a comprehensive system for network security monitoring and management. The detailed functionalities of elements such as NMEs, NSC, APT, DHM, dashboard code generator, and data router, along with their structural characteristics and interactions, may form the foundation of this invention's ability to dynamically address complex cybersecurity challenges in diverse network environments.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
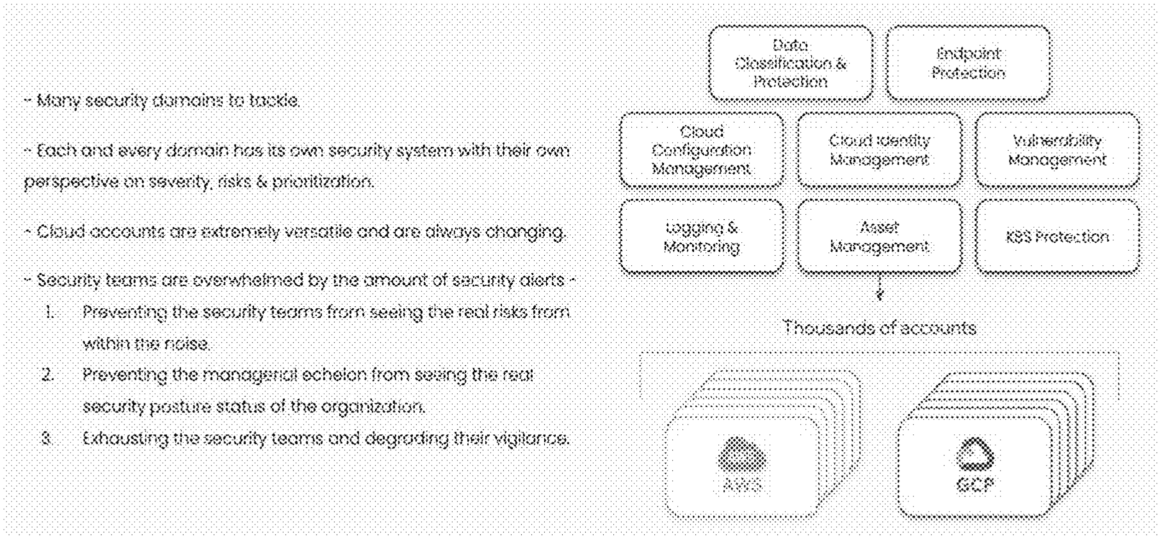
FIG. 1 is functional block diagram with annotations illustrating processes and resources of an exemplary legacy enterprise computing platform consisting of a variety of computing resource types, including both physical and virtual (i.e. Cloud and SaaS) computing resources interconnected as segments and or domains of the same hybrid network.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read-only memories (EEPROMs), magnetic or optical cards, or any other type of media suitable for storing electronic instructions and capable of being coupled to a computer system bus.

The processes and displays presented herein are not inherently related to any particular computer or other apparatus. Various general-purpose software, systems, and platforms may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein Embodiments of the present invention encompass methods, devices, systems, and functionally associated machine-executable code for providing a comprehensive cybersecurity system capable of monitoring and managing heterogeneous or hybrid computing networks. Embodiments of the present invention also include cybersecurity systems themselves, integrated or otherwise functionally associated with various components, each tailored to perform specific functions that collectively enhance the network security posture of a protected network. Key aspects of the invention include Network Monitoring Elements (NMEs), an Attack Path Tracer (APT) (also referred to as an Attack Path Generator), a Network Security Controller (NSC), Discovery and Handshake Modules (DHM), a dashboard code generator and configuration editor, and a data router. Each of these components plays a vital role in maintaining the integrity and security of networks protected according to embodiments of the present invention.

Network Monitoring Elements (NMEs) form the foundational layer of the system. Deployed throughout the network, these elements are responsible for continuously monitoring network parameters and events. NMEs have the capability to detect unusual network activity, unauthorized access attempts, and potential vulnerabilities. Some NMEs are equipped with logging capabilities, enabling them to record and store detected events and parameters. These logs can be stored locally at the NME or in a centralized repository, providing a historical record of network activity and aiding in the analysis of network health. NMEs can be tailored to meet the specific requirements of the network segments they monitor. For example, an NME in a cloud environment may monitor API access, while an NME on a physical server may focus on packet-level analysis and intrusion detection. NMEs may also facilitate monitoring compliance by assessing configurations against predetermined baselines to identify deviations that could introduce security risks.

FIG. 1 shows the complexity of maintaining cybersecurity in an enterprise environment that combines both physical and cloud resources. NMEs play a critical role by monitoring these varied segments, each of which has unique security requirements and communication patterns. For example, NMEs monitoring a physical server may focus on packet flow analysis, while NMEs monitoring cloud-based segments may focus on API usage patterns and user authentication events. In this manner, NMEs can ensure that security measures are contextually appropriate for the environment in which they are deployed, providing a more nuanced approach to detecting threats and vulnerabilities. Furthermore, NMEs may be configured to integrate with third-party security tools, expanding the system's capacity to leverage pre-existing security measures within the network infrastructure.

Figure 3A:
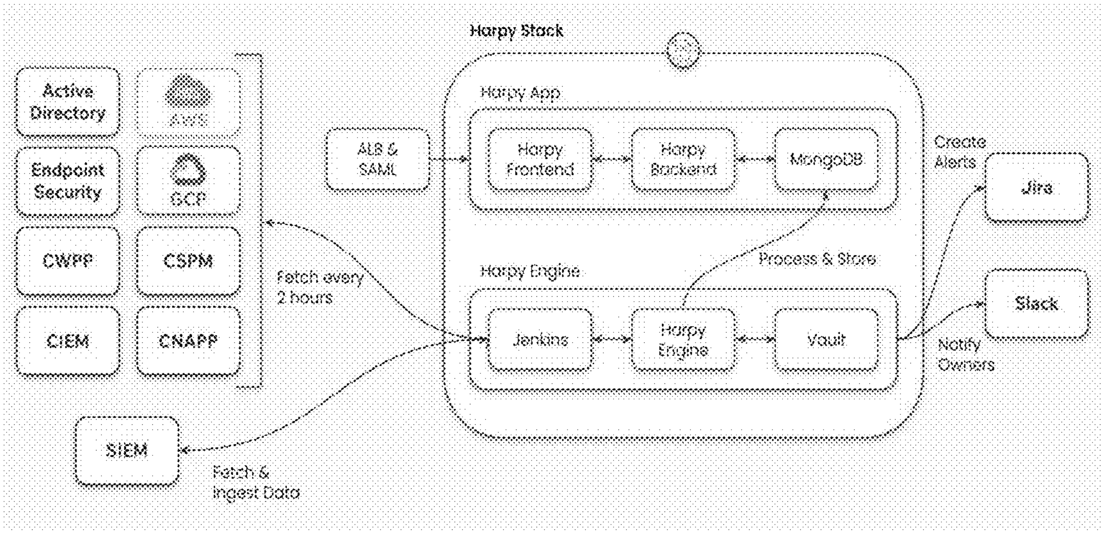
FIG. 3A is a computing network diagram of an exemplary system according to embodiments of the present invention integrated with an enterprise's hybrid computing system, wherein the system is described and illustrated in terms of two main asynchronous components: (a) An engine for running autonomous background process such as network discovery and attack path detection, and (b) an application with user interface functionality and a variety or analysis and inspection tools.
Figure 3B:
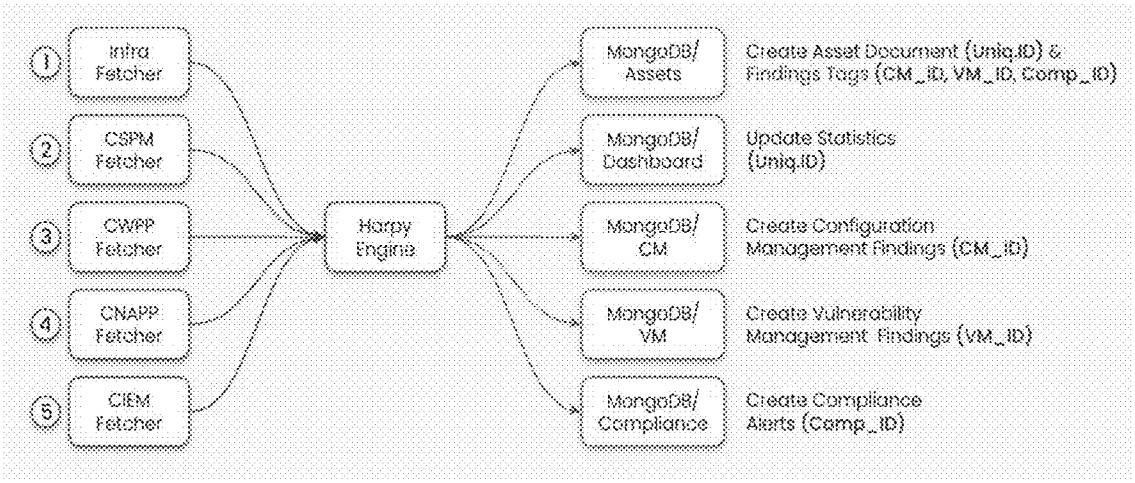
FIG. 3B is a computing network diagram of an exemplary system according to embodiments of the present invention and integrated with an exemplary hybrid network from which network activity data is collected, processed and stored.
Figure 3C:
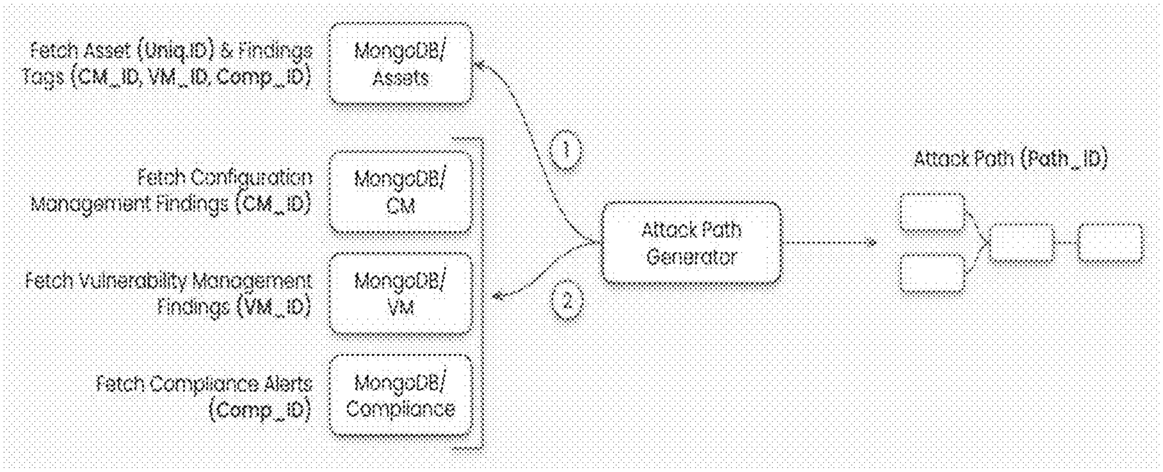
FIG. 3C is a computing networking diagram illustrating an Attack Path Tracer, also referred to as an Attack Path Generator, according to embodiments of the present invention uses computing network activity data to identify Attack paths which can be exploited for an cyberattack on the monitored computing network.

The Attack Path Tracer (APT) is a component of the cybersecurity system whose primary function is to scan the network, identifying and mapping potential paths that could be exploited in a cyberattack. The APT operates both proactively to assess network vulnerabilities and reactively in response to suspected network attacks. By mapping potential attack paths, the APT enables the system to preemptively address security weaknesses and respond quickly to detected real-time threats. As illustrated in FIG. 3C, the APT uses data collected from NMEs across different nodes of the network to build possible attack scenarios, such as identifying how compromised cloud credentials could lead to access to critical data storage systems. The APT's results may be visualized within the dashboard to provide administrators with actionable insights into vulnerabilities that span multiple network domains. APT may also work in tandem with machine learning models to predict potential attack vectors based on historical data and evolving threat landscapes, thereby enhancing the proactive defense capabilities of the system.

Figure 2A:
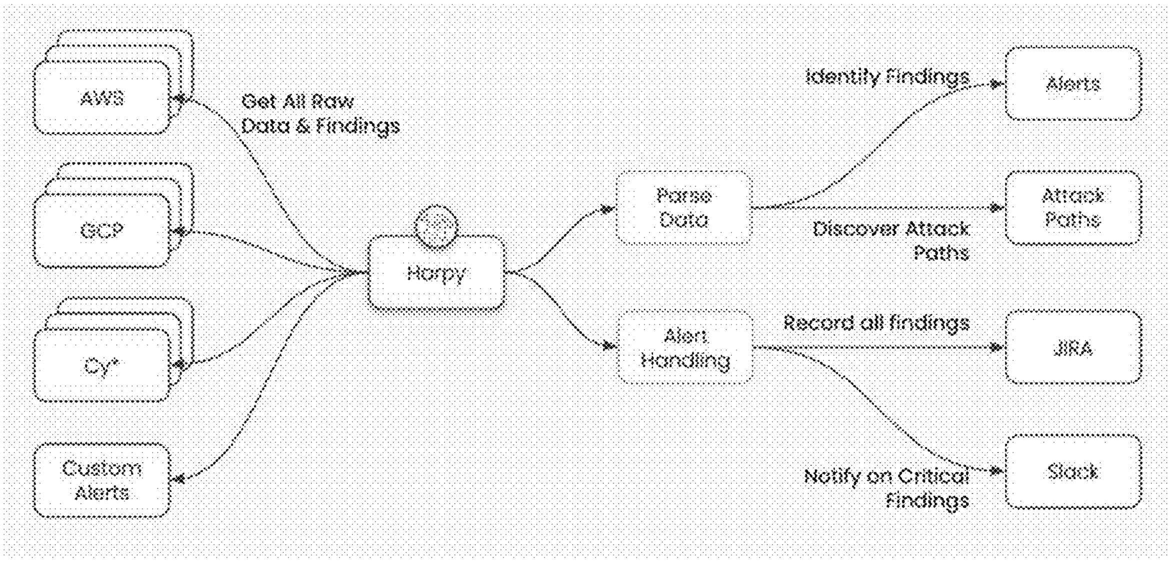
FIG. 2A is a computing networking block diagram illustrating an exemplary cybersecurity monitoring system according to embodiments of the present invention connected to and monitoring various segments of a hybrid enterprise computing network including both physical and cloud based resources.
Figure 2B:
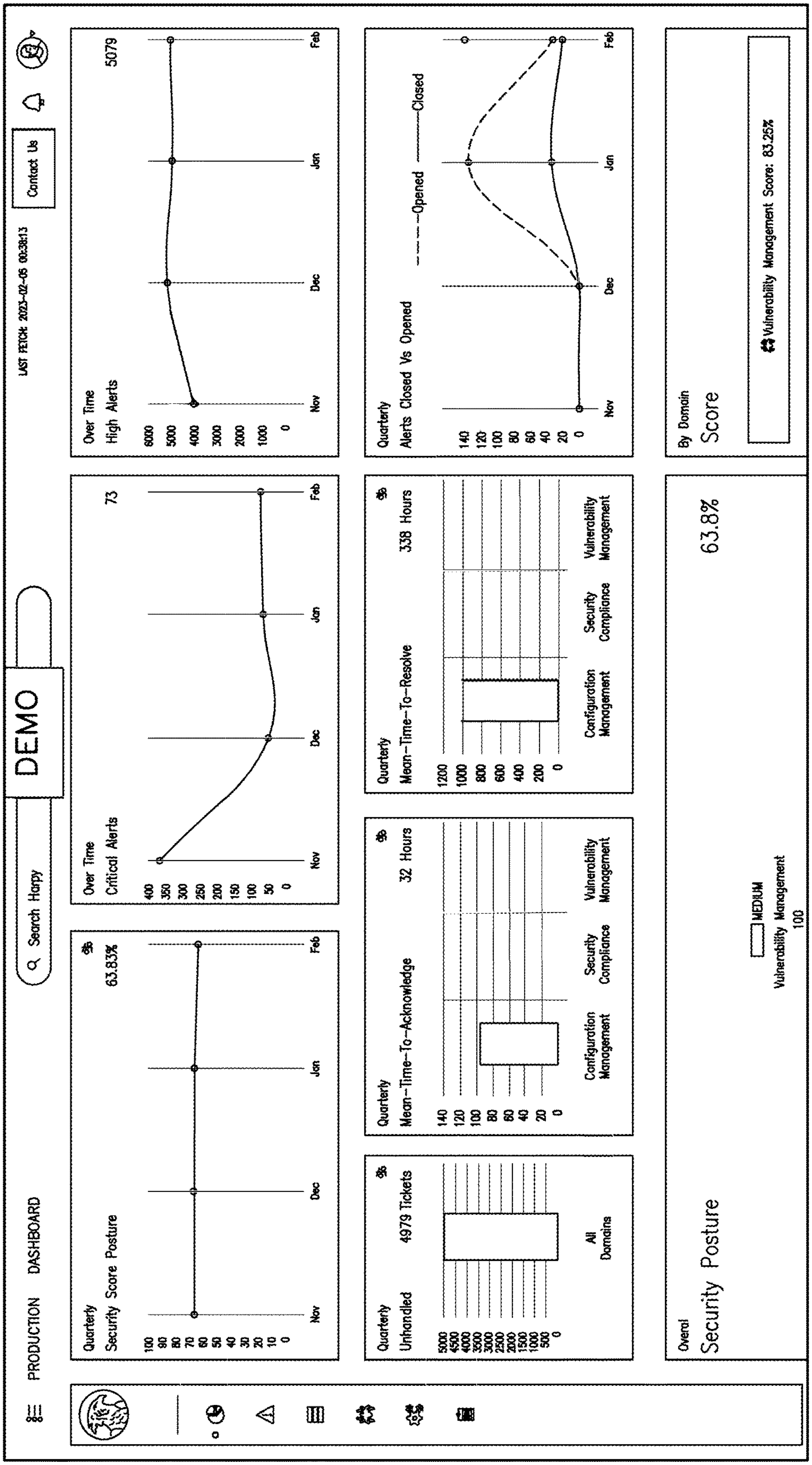
FIGS. 2B to 2J are screenshots from an exemplary system according to embodiments of the present invention, wherein each screenshot illustrates a different set of system functions and capabilities.
Figure 2C:
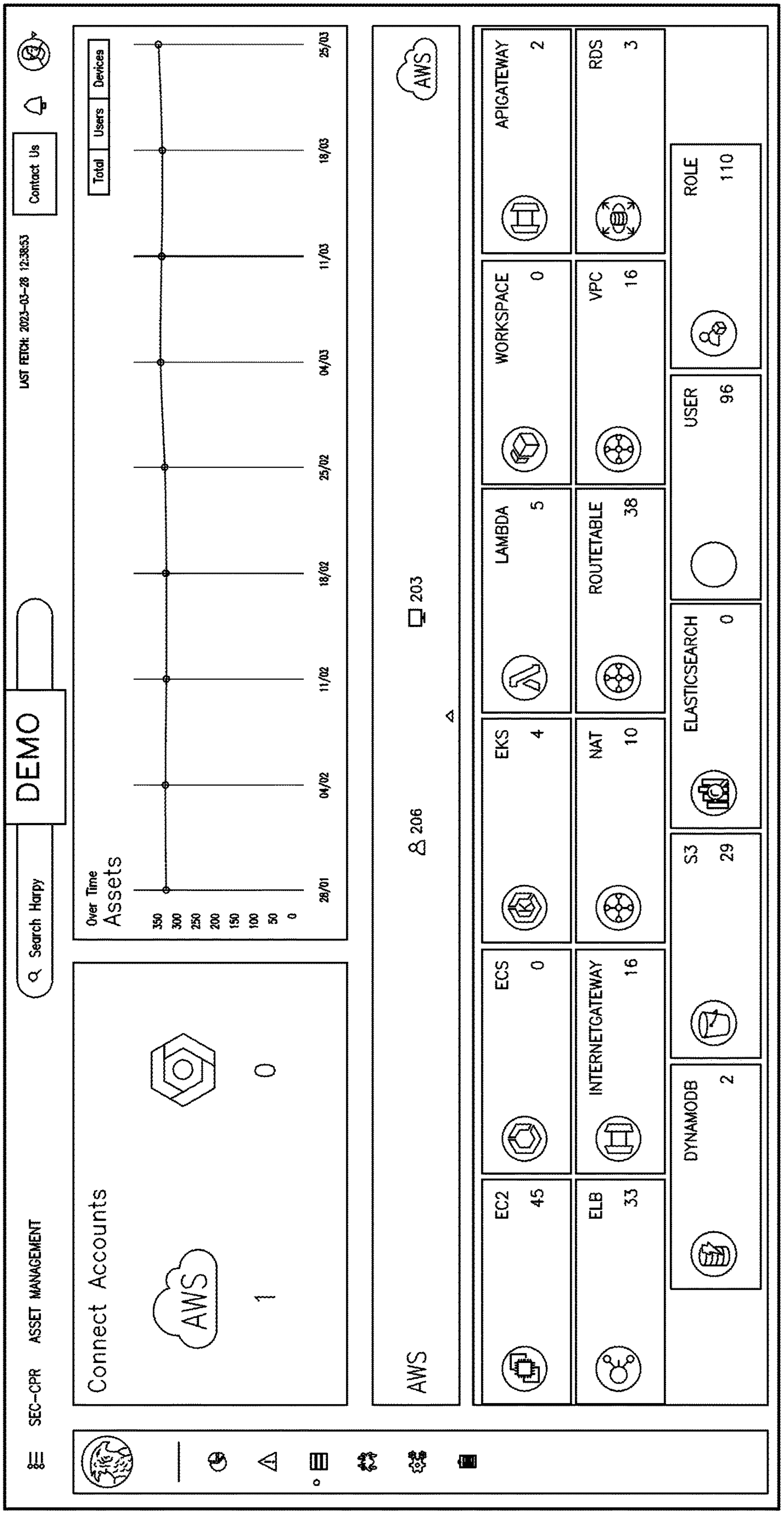
Figure 2D:
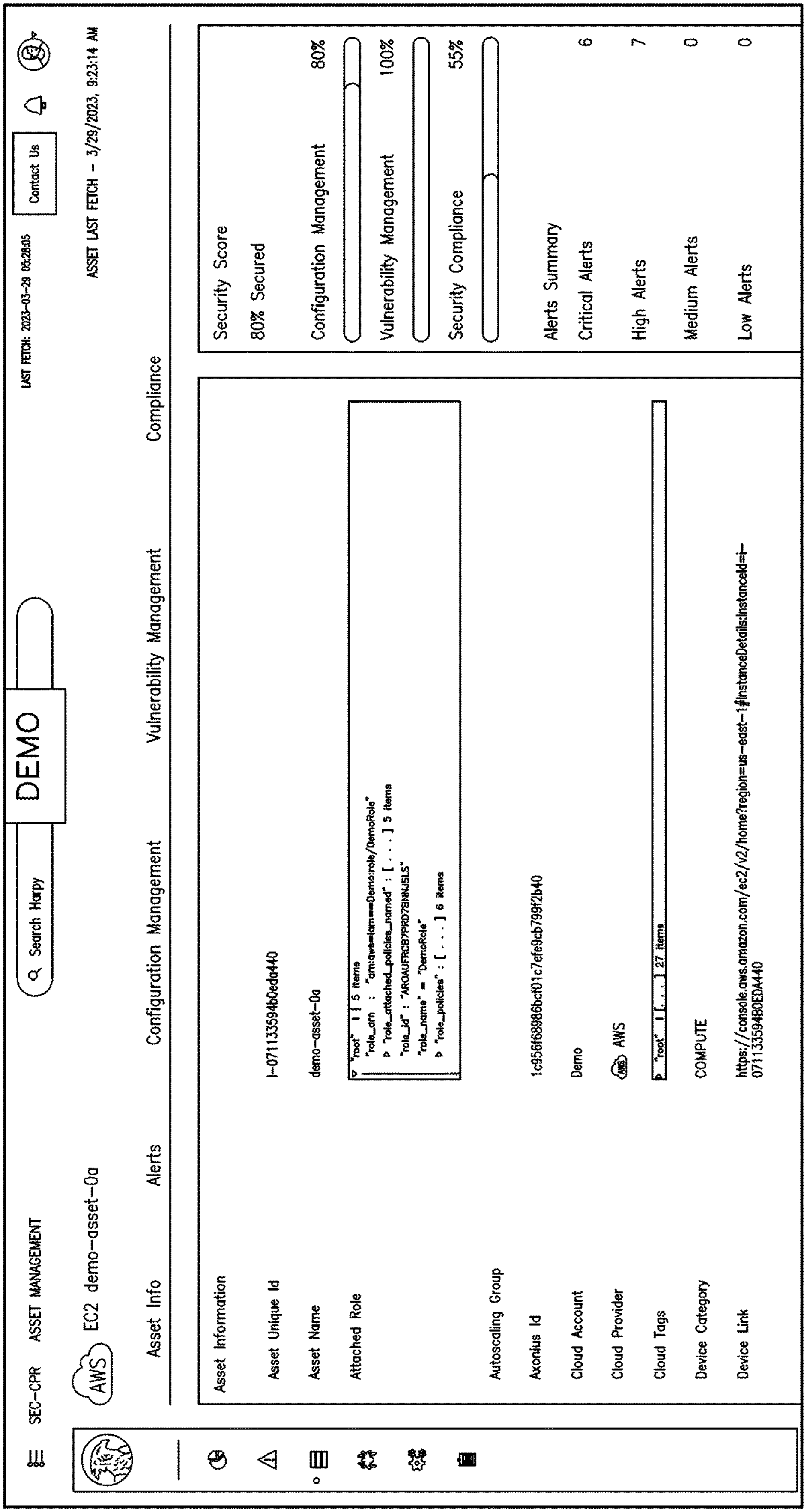
Figure 2E:
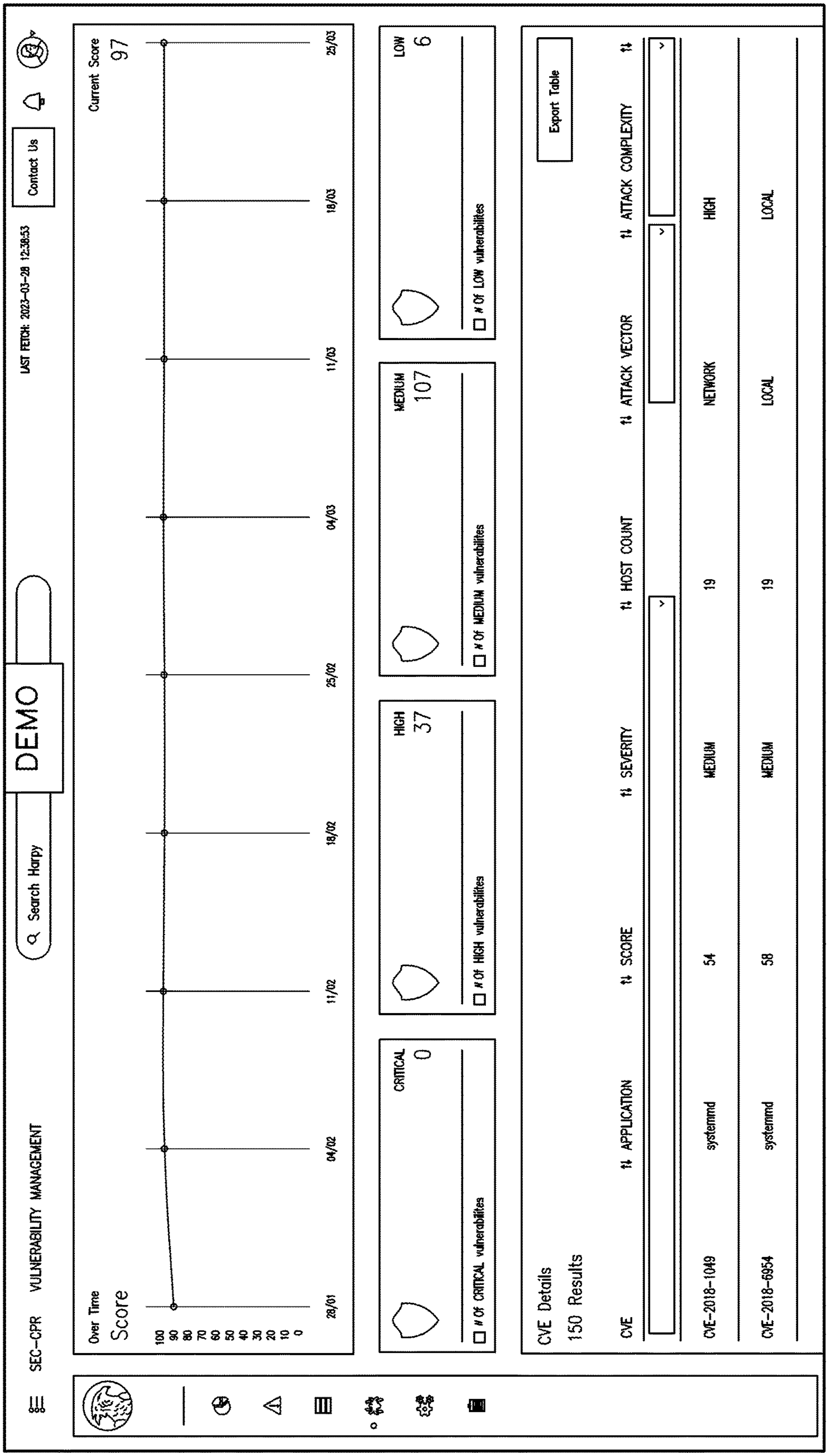
Figure 2F:
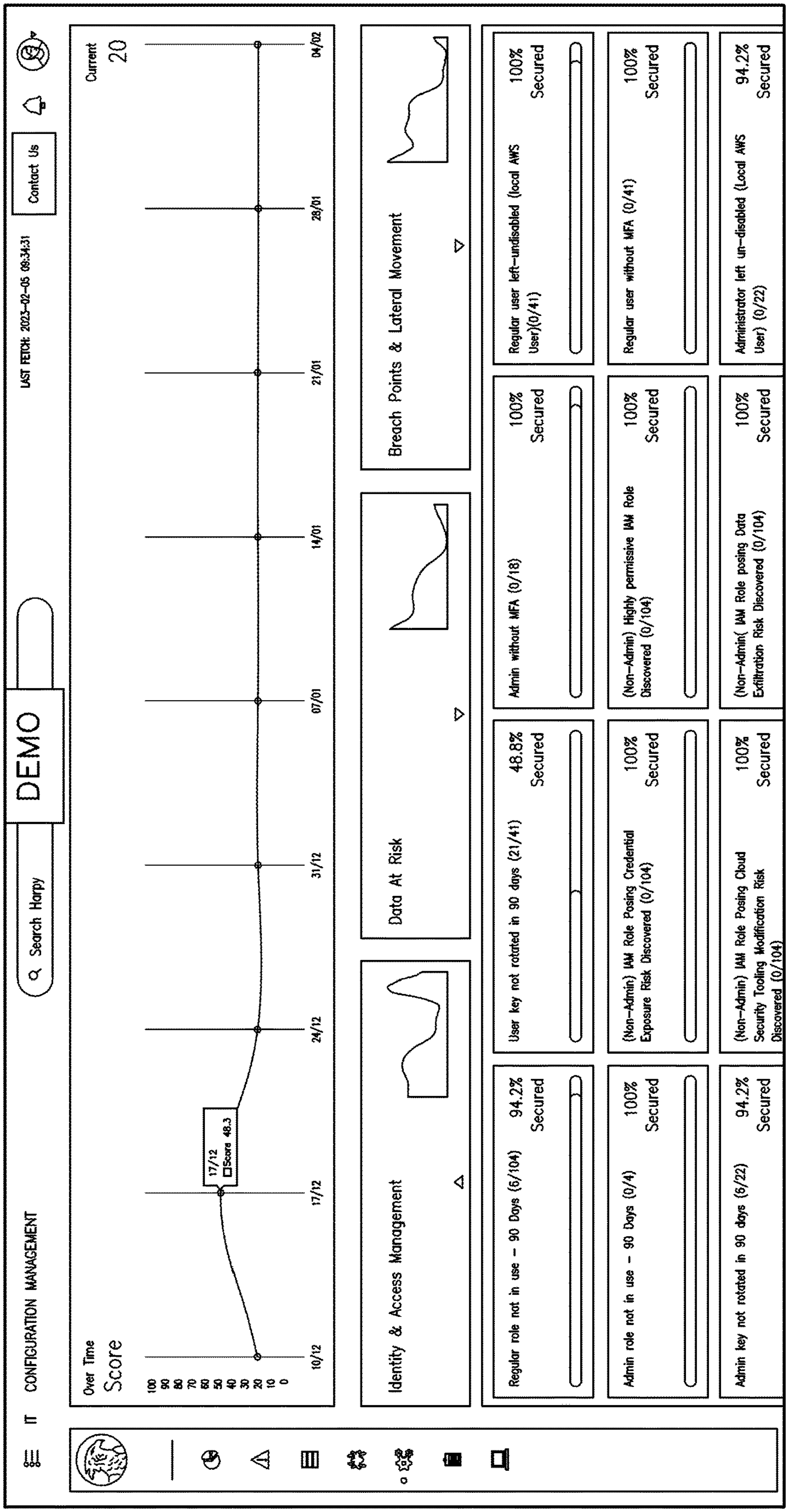
Figure 2G:
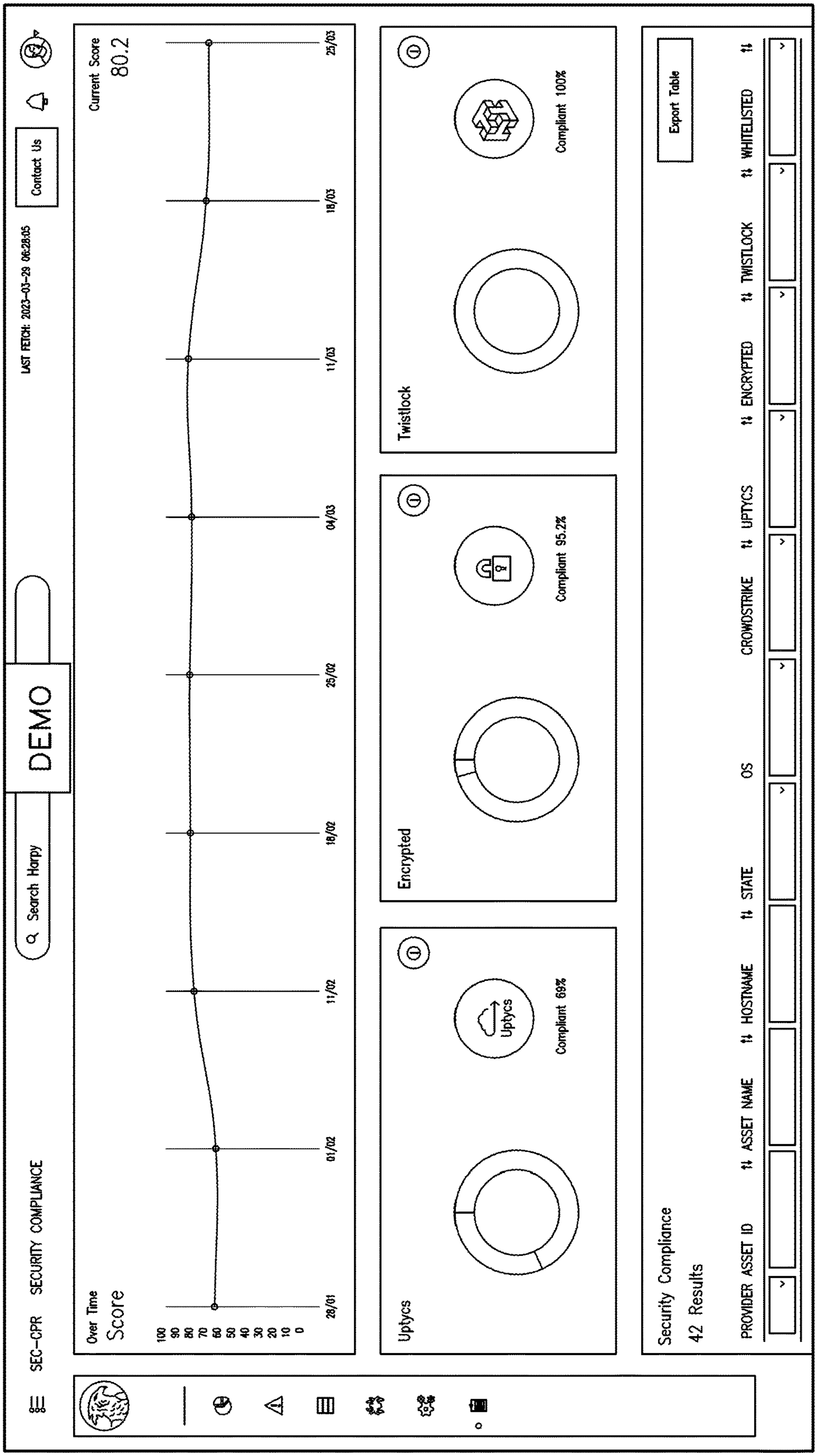
Figure 2H:
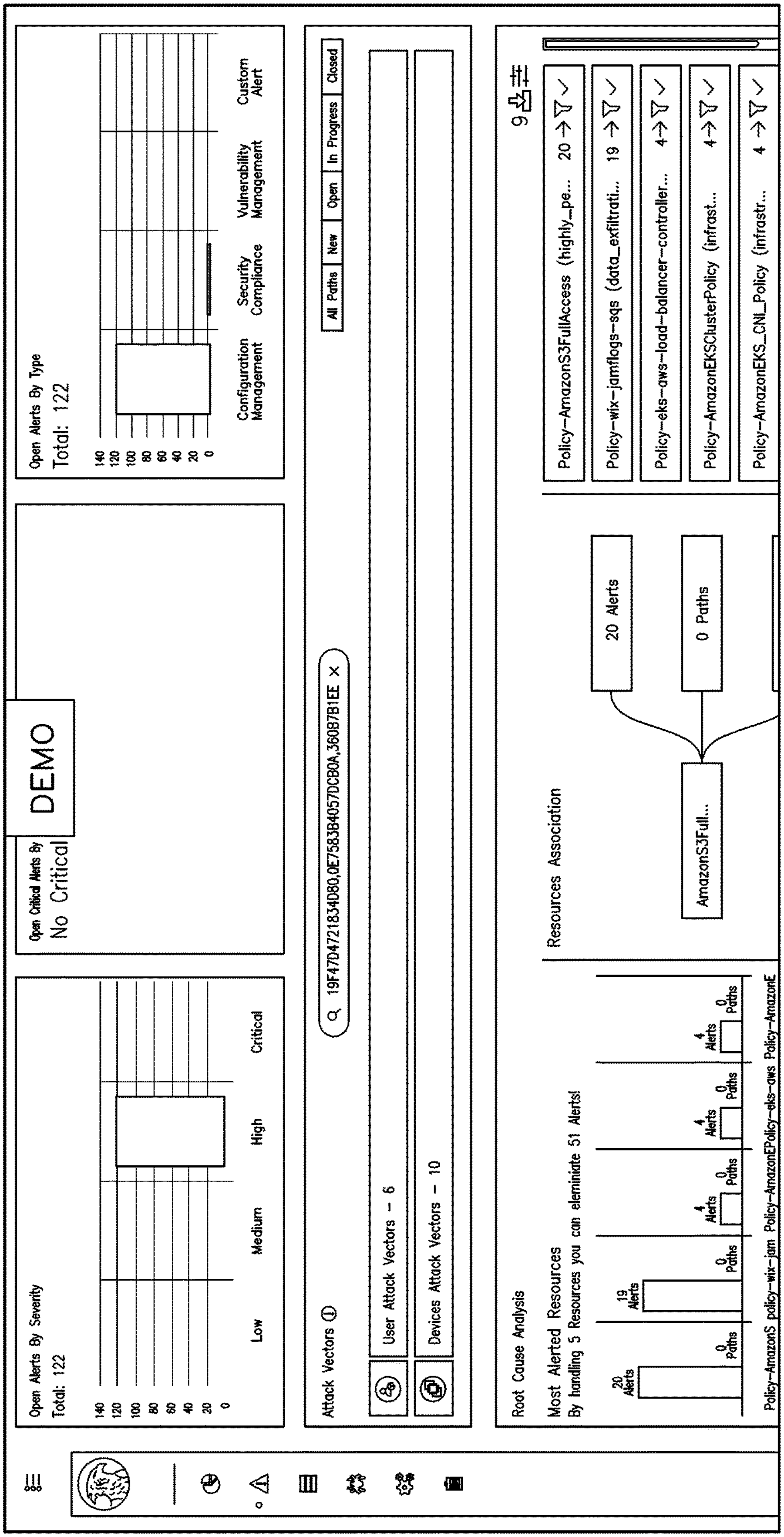
Figure 2I:
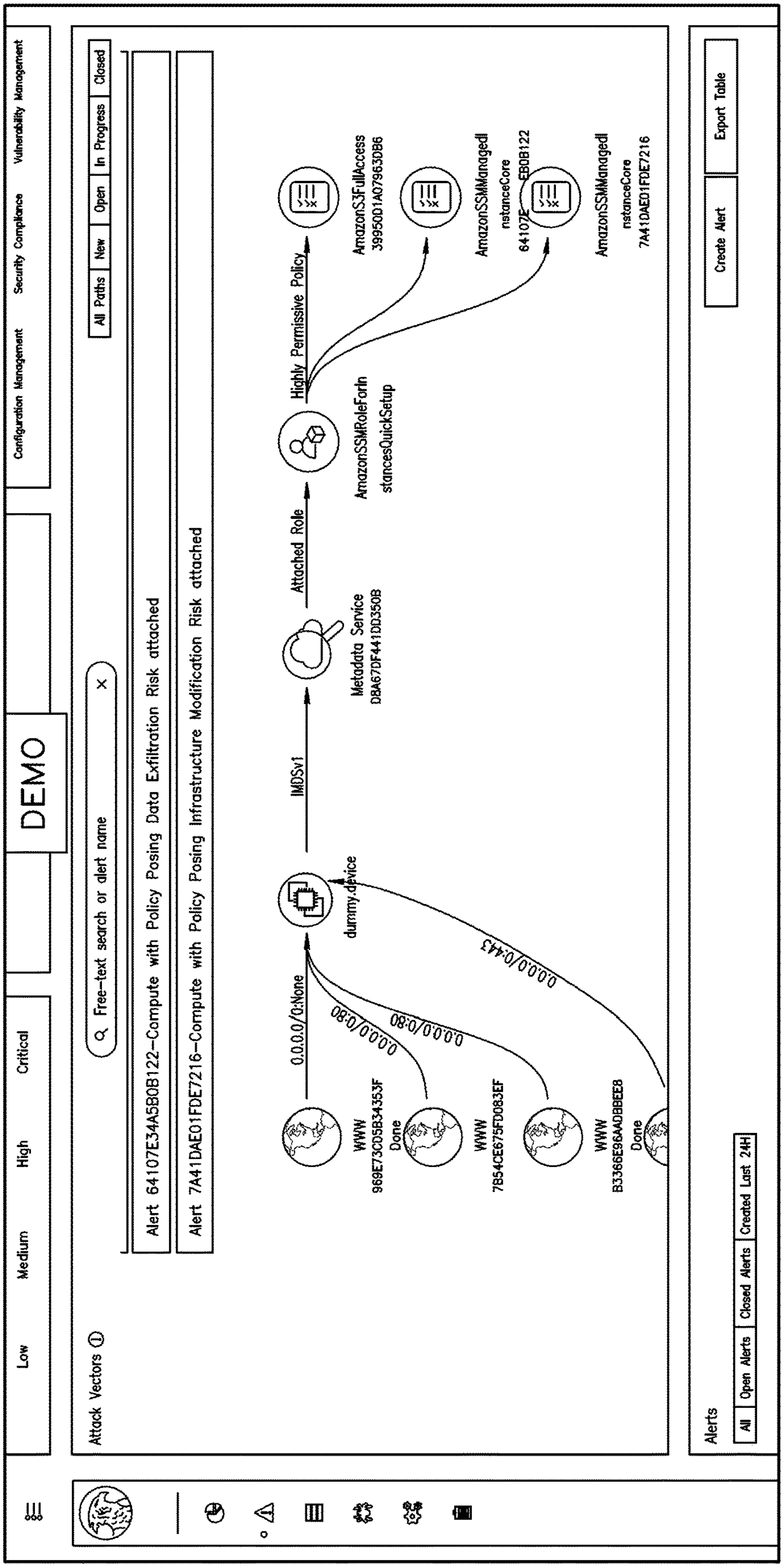
Figure 2J:
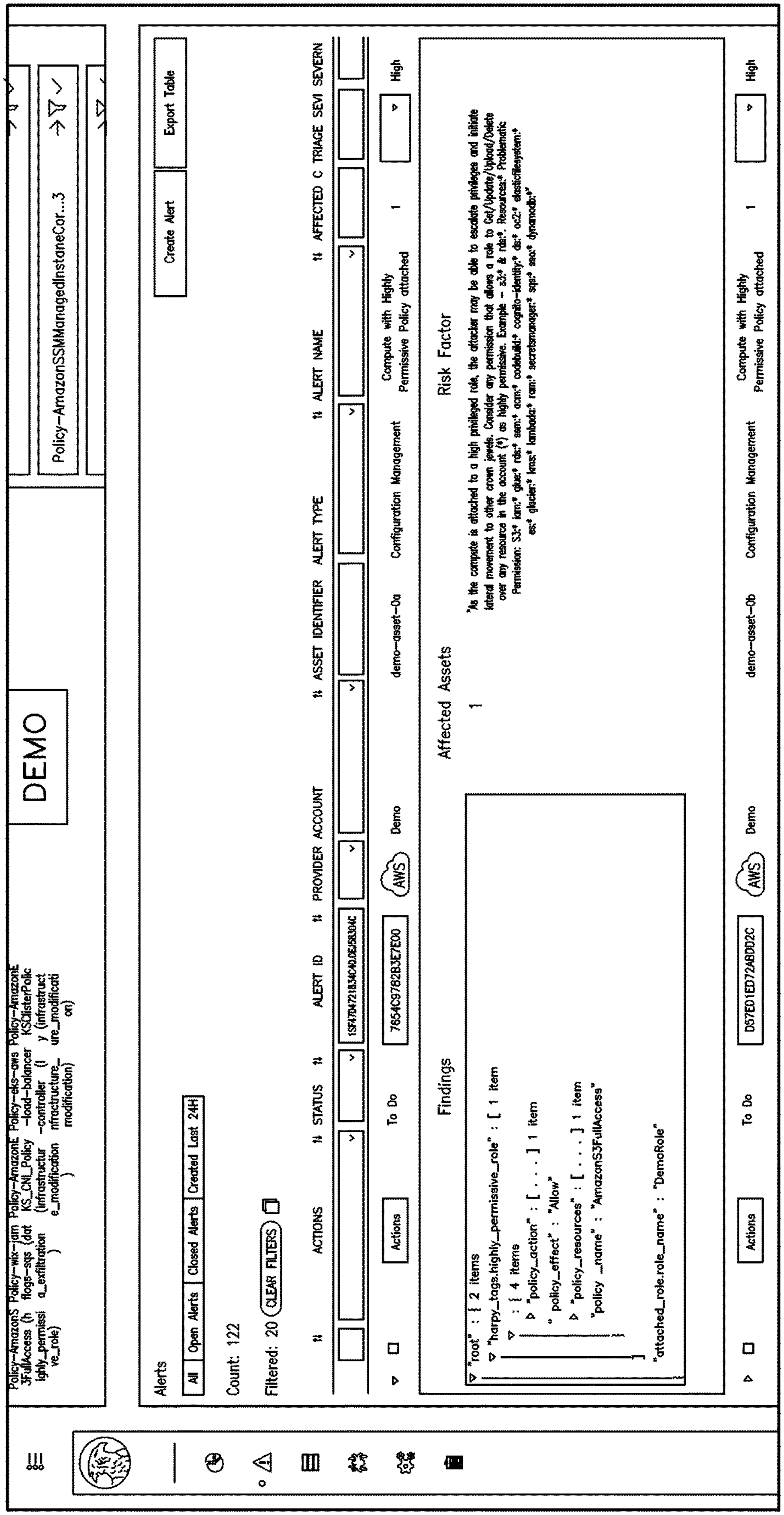

FIG. 2A illustrates an exemplary cybersecurity monitoring system integrated across various segments of a hybrid enterprise computing network. The Network Security Controller (NSC) serves as the central command of the system. It is designed to receive, process, and act upon data provided by both NMEs and the APT. Upon receiving indications of potentially malicious event detections—especially those relating to or in proximity with potential cyberattack paths—the NSC is configured to trigger attack alerts and notifications. It plays a crucial role in collating data from various sources, analyzing it, and determining the appropriate response to potential security incidents. The NSC may also prioritize responses based on the severity of the threat, asset criticality, and proximity to critical infrastructure. For example, the NSC might escalate alerts involving sensitive data assets or adjust monitoring levels based on detected anomalous activities in high-risk segments. The NSC may further use risk assessment metrics to determine the probability of successful exploitation, allowing teams to prioritize mitigation efforts effectively.

The Discovery and Handshake Modules (DHM) are critical for the dynamic adaptation of the system to an evolving network environment. These modules are tasked with identifying and establishing communication with various monitoring elements deployed across the network. As seen in FIG. 3B, the DHM maintains an updated map of active NMEs and continuously integrates new or modified nodes into the monitoring system. For example, if a new virtual machine is launched in a cloud environment, the DHM will detect this addition, initiate a handshake, and incorporate it into the monitored network. This ensures that monitoring coverage is continuously adjusted as the network grows or changes. Additionally, the DHM is capable of identifying misconfigurations or potential blind spots in monitoring, allowing the NSC to deploy additional NMEs or adjust configurations to close these gaps. The DHM may also facilitate cross-environment coordination by ensuring consistent monitoring practices are applied across cloud-based and on-premises resources, maintaining visibility despite the network's heterogeneity.

Figure 3D:
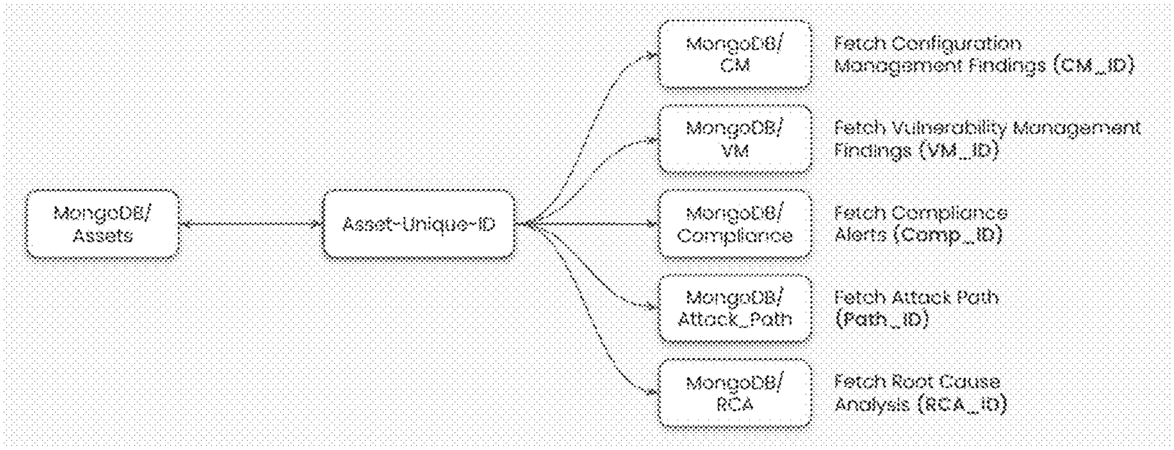
FIG. 3D is a computing network diagram of a system according to embodiments of the present invention performing network asset/resource identification and tagging in the context of identified actual and possible attack paths associated with an alert.

FIG. 3D shows how the system performs network asset/resource identification and tagging in the context of identified attack paths. Assets across the network may be tagged based on their configuration, vulnerability status, and the presence of potential attack vectors. Tags may be automatically applied by the system based on data gathered by NMEs, and the tagging helps security teams prioritize which assets require immediate attention. For instance, if an asset is tagged both for a critical misconfiguration and as part of a potential attack path, it will be highlighted on the dashboard for immediate action. Tagging may also be based on the criticality of assets—such as assets holding personally identifiable information (PII)—so that high-value targets receive priority monitoring and protective actions. Additionally, tagging can facilitate compliance auditing by labeling assets that do not meet specific regulatory or internal security standards, prompting actions to remediate compliance gaps.

The dashboard code generator is responsible for creating browser-renderable HTML and JavaScript code that facilitates user-interactive interfaces for data visualization and system control. The generated dashboard code may define data visualization and system control interface elements, providing a holistic view of the network security status. As depicted in FIGS. 2B to 2J, the dashboards show different functionalities such as vulnerability management, asset tracking, and alert monitoring. The dashboards are designed to help users visualize complex data in a simplified form—for example, by showing a unified security score, tracking critical vulnerabilities, or illustrating active attack paths. The dashboards may also be tailored for different types of users, such as system administrators, security analysts, or C-level executives, each requiring varying levels of detail and specificity in their views. Users may configure their dashboards to display only the most pertinent information, providing role-based access to data and ensuring the visibility of key metrics aligned with their responsibilities.

The dashboard configuration editor allows users to customize the displayed elements, including types, configurations, and placements within the dashboard. For instance, a security manager may use the editor to add a new panel showing the number of active attack paths or adjust the layout to prioritize the display of the most critical alerts. The editor may also allow customization of alert thresholds, enabling users to specify conditions under which particular alerts should be triggered, thereby aligning system alerts with organizational security policies and risk tolerance levels. The configuration editor further supports user-defined templates, which allow teams to standardize their monitoring dashboards across the organization, ensuring consistent and effective use of the system.

Figure 4:
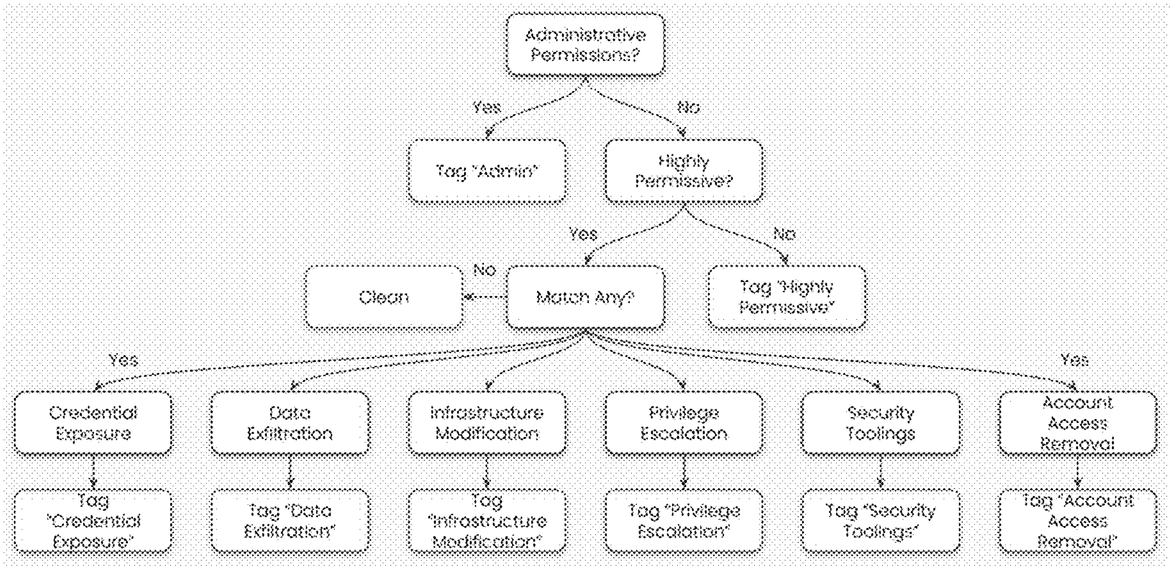
FIG. 4 is a flow diagram illustrating the steps of a cloud resource tagging process in accordance with embodiments of the invention.

FIG. 4 provides a flow diagram illustrating the cloud resource tagging process. The tagging process is automated and based on detected conditions, which may include evaluating permissions, identifying misconfigurations, and assessing risk levels. The Identity and Access Management (IAM) component, for example, breaks down thousands of permissions into clusters to determine which permissions pose the highest risks. Tags such as Highly Permissive, Data Exfiltration, or Privilege Escalation are assigned to resources accordingly. The automated tagging process significantly reduces the manual workload on analysts and ensures that risks are consistently and accurately categorized. Additionally, tagging facilitates targeted mitigation by indicating which permissions need to be adjusted to reduce exposure to specific risks. The system may also incorporate machine learning capabilities to improve tagging accuracy by analyzing past incidents and adjusting tag application criteria to better reflect emerging threat patterns.

The data router plays a vital role in managing the flow of information from monitoring elements to analysis and storage components within the system. It is responsible for routing data from NMEs, the NSC, and other system components to the dashboard and other parts of the network as needed. This routing ensures that the most up-to-date network security information is always available where it is needed, enhancing the system's responsiveness to network events. As illustrated in FIG. 3A, the data router ensures that data collected from infrastructure components is correlated, analyzed, and presented to the relevant dashboards in a timely manner.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A system for monitoring a heterogeneous computer network including multiple computing domains hosted on physical and virtual computing clusters which interconnect through a plurality of data network segments, wherein said system comprises:

a heterogeneous set of Network Monitoring Elements (NMEs), wherein one or more of said NMEs are deployed to different respective nodes on the heterogeneous computer network and are configured to detect network related parameters and events associated with their respective nodes;

and a Network Security Controller (NSC);

at least one Discovery and Handshake Module (DHM) functionally associated with said NSC and configured to identify and establish communication with NMEs of varying categories deployed across said computer network; and an Attack Path Tracer (APT) communicatively coupled with said NSC, wherein said APT is configured to scan across clusters and segments of said computer network to discover and map potential attack paths by utilizing data received from the NMEs discovered by said at least one DHM;

wherein said NSC is configured to, upon receiving an indication of an event detection relating to a specific category of events occurring within a mapped potential attack path from said APT, trigger an alert notification.

2. The system according to claim 1, wherein said NSC communicates with one or more of said NMEs and receives indications relating to events of various event types detected by respective monitoring elements, wherein events of specific event types may include a combination of one or more events of specific event types occurring concurrent with a combination of one or more specific network parameters.

3. The system according to claim 2, wherein said NSC collects network activity information including attack path information from multiple sources upon said NSC triggering a suspected attack alert notification.

4. The system according to claim 3, wherein one or more NMEs maintain logs of events they detect and said NSC retrieves these logs upon triggering of a suspected attack alert notification.

5. The system according to claim 4, wherein said monitoring elements store event logs in a centralized repository and said NSC is configured to retrieve the logs from said centralized repository.

6. The system according to claim 5, wherein said NSC retrieves and analyzes specific logs corresponding to parameters associated with a specific suspected cyberattack which triggered a specific attack alert notification.

7. The system according to claim 1, wherein said DHM receives data relating to activity detections from monitoring elements.

8. The system according to claim 1, wherein said NSC or a functionally associated module deploys monitoring elements to nodes of said computer network based on APT mapping.

9. The system according to claim 1 further comprising a dashboard code generator configured to generate browser renderable html and Java Script dashboard code based on definitions within a system dashboard configuration file.

10. The system according to claim 8, wherein said dashboard code defines both data visualization and system control interface elements.

11. The system according to claim 8, wherein said dashboard code is in a Document Object Model (DOM) format.

12. The system according to claim 8, further comprising a dashboard configuration editor to provide a user interface for appending or editing dashboard element: (a) types, (b) configurations, and (c) placements definitions within the dashboard configuration file.

13. The system according to claim 8, further comprising a data router for routing data from monitoring elements and from said NSC to dashboard elements within an instance of rendered dashboard code.

* * * * *